(12) United States Patent
Zhovnirovsky et al.

(10) Patent No.: US 8,200,094 B1
(45) Date of Patent: Jun. 12, 2012

(54) SYSTEM AND METHOD FOR FREE SPACE OPTICAL CONNECTOR ALIGNMENT

(75) Inventors: Igor Zhovnirovsky, Newton, MA (US); Subhash Roy, Lexington, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 429 days.

(21) Appl. No.: 12/563,962

(22) Filed: Sep. 21, 2009

Related U.S. Application Data (63) Continuation-in-part of application No. 12/422,265, filed on Apr. 11, 2009.

(51) Int. Cl.
*H04B 10/00* (2006.01)

(52) U.S. Cl. ........ 398/129; 398/118; 398/119; 398/128; 398/130; 398/131

(58) Field of Classification Search ........... 398/118–131
See application file for complete search history.

(56) References Cited

U.S. PATENT DOCUMENTS

| | | | | |
|---|---|---|---|---|
| 4,823,402 A * | 4/1989 | Brooks | | 398/124 |
| 5,347,387 A * | 9/1994 | Rice | | 398/129 |
| 5,448,391 A * | 9/1995 | Iriyama et al. | | 398/123 |
| 5,594,580 A * | 1/1997 | Sakanaka et al. | | 398/122 |
| 5,684,614 A * | 11/1997 | Degura | | 398/131 |
| 5,770,850 A * | 6/1998 | Bowen et al. | | 250/203.1 |
| 5,867,294 A * | 2/1999 | Sakai | | 398/129 |
| 6,122,084 A * | 9/2000 | Britz et al. | | 398/131 |
| 6,335,811 B1 * | 1/2002 | Sakanaka | | 398/129 |
| 6,493,122 B1 * | 12/2002 | Degura | | 398/128 |
| 6,510,401 B2 * | 1/2003 | Martin et al. | | 702/150 |
| 6,577,421 B1 * | 6/2003 | Cheng et al. | | 398/129 |
| 6,821,029 B1 * | 11/2004 | Grung et al. | | 385/92 |
| 6,856,437 B2 * | 2/2005 | Witt et al. | | 359/200.7 |
| 6,894,818 B1 * | 5/2005 | Cicchiello et al. | | 359/201.1 |
| 7,263,297 B2 * | 8/2007 | Verbana | | 398/201 |
| 7,292,788 B2 * | 11/2007 | Triebes et al. | | 398/122 |
| 7,343,099 B2 * | 3/2008 | Wirth et al. | | 398/131 |
| 7,565,082 B2 * | 7/2009 | Yazaki et al. | | 398/129 |
| 7,593,641 B2 * | 9/2009 | Tegge, Jr. | | 398/125 |
| 7,643,755 B2 * | 1/2010 | Rafferty et al. | | 398/131 |
| 2002/0131121 A1 * | 9/2002 | Jeganathan et al. | | 359/152 |
| 2002/0196506 A1 * | 12/2002 | Graves et al. | | 359/172 |
| 2004/0052465 A1 * | 3/2004 | Verbana et al. | | 385/49 |
| 2004/0208597 A1 * | 10/2004 | Wittenberger et al. | | 398/130 |
| 2004/0258415 A1 * | 12/2004 | Boone et al. | | 398/125 |
| 2005/0276610 A1 * | 12/2005 | Hirayama | | 398/140 |
| 2006/0018661 A1 * | 1/2006 | Green et al. | | 398/128 |
| 2009/0028579 A1 * | 1/2009 | Deng | | 398/200 |

* cited by examiner

*Primary Examiner* — Li Liu

(74) *Attorney, Agent, or Firm* — Law Office of Gerald Maliszewski; Gerald Maliszewski

(57) ABSTRACT

A method and system are provided for aligning the optic port of a device having a Free Space Optics (FSO) connector. In a link device with an FSO connector, a controller determines that an optic port alignment procedure is required. A lens is set to an initial wide beam dispersion mode, and a mirror is set to an initial position angle. Note: the lens and mirror may be the FSO connector receive path or transmit path. An optical signal is communicated at a first low baud rate, and the first baud rate communications are optimized by iteratively adjusting the mirror and narrowing the lens focus. Then, an optical signal is communicated at a second baud rate, faster than the first baud rate, and the second baud rate communications are optimized by iteratively adjusting the mirror and narrowing the lens focus.

19 Claims, 11 Drawing Sheets

SYSTEM AND METHOD FOR FREE SPACE OPTICAL CONNECTOR ALIGNMENT

RELATED APPLICATIONS

This application is a Continuation-in-Part of a pending application entitled, FREE SPACE OPTICAL CONNECTOR, invented by Igor Zhovnirovsky et al., Ser. No. 12/422,265, filed Apr. 11, 2009, which is incorporated herein by reference.

BACKGROUND OF THE INVENTION

1. Field of the Invention

This invention generally relates to the interfacing of electrical and optical communication signals and, more particularly, to a free space self-aligned optical connector and associated alignment method.

2. Description of the Related Art

Conventionally, communication signals are carried via conductive metal lines on a circuit board or metal wires in a connector cable. Copper and aluminum are metals often used for this purpose. With the increased use of high-speed long distance communications, optical signals were introduced, carried through an optical fiber medium. In some communication links, an interface must be used to convert between electrical and optical signals.

An electrical system such as a computer or communications network is comprised of a plurality of modules that are connected via cables. The cables are bulky and prone to failure. Optical cables are relatively stiff and difficult to fit into limited cabinet space or "bend" around corners.

A small form-factor pluggable (SFP) is a compact, hot-pluggable transceiver used in optical communications. It interfaces a network device mother board, such as a switch, router, or media converter, to a fiber optic or copper networking cable. It is a popular industry format supported by several network component vendors. SFP transceivers are designed to support SONET, Gigabit Ethernet, Fibre Channel, and other communications standards. The standard is expanding to SFP+, which will be able to support data rates up to 10.0 Gbit/s (e.g., 8 gigabit Fibre Channel and 10 GbE). SFP+ module versions for optics as well as copper are being introduced.

SFP transceivers are available with a variety of different transmitter and receiver types, allowing users to select the appropriate transceiver for each link, to provide the required optical reach over the available optical fiber type (e.g., multi-mode fiber or single-mode fiber). Optical SFP modules are commonly available in several different categories: 850 nm 550 m MMF (SX), 1310 nm 10 km SMF (LX), 1550 nm [40 km (XD), 80 km (ZX), 120 km (EX or EZX)], and DWDM. There are also CWDM and single-fiber "bi-directional" (1310/1490 nm Upstream/Downstream) SFPs. The SFP was designed after the GBIC interface, and allows for greater port density (number of transceivers per inch along the edge of a mother board) than the GBIC, which is why SFP is also known as mini-GBIC.

It is also possible to communicate optical signals via free space. The conventional television remote control uses infrared optical wavelengths to communicate commands. However, the optical signals are not focused, and can only be used to carry very simple communications a very short distance. The unfocused nature of the communications and the portable nature of the remote control unit prevent it from being used as a receiver, i.e. to receive signals from a television or set-top box.

It would be advantageous if optical signals could be communicated between circuit boards via free space, without the use of fiber optic cables. An optical signal can transport data over longer distances and with fewer errors if the signal paths between transmitter and receiver can be aligned, permitting in turn, the light source to be more tightly focused. However, due to manufacturing tolerances, "play" in the connectors, mechanically disruptive events, and temperature variations, such an optical link would likely require tedious and frequent realignment.

It would be advantageous if a self-alignment system existed for optical signals communicated between circuit boards via free space, to support uninterrupted communication.

SUMMARY OF THE INVENTION

Disclosed herein is a Free Space Optical (SPO) connector. In one aspect, a 4-way FSO small form-factor pluggable (SFP) is presented that allows high speed data connection in 4 orthogonal directions simultaneously over the air in direct line-of-sight (LOS). As an FSO SFP connector, each beam carries a 10 gigabits per second (Gbps) information stream adding up to a total connector bandwidth of 40 Gbps. The communication channels may be protocol agnostic, suitable for both data and telecommunications links. The FSO connector reduces dependency on expensive and costly-to-maintain fiber optic cables. To build the equivalent of an N×N mesh FSO interconnect would require $(N-1)^2$ fiber optic cables, in addition to regular SFP connectors. Advantageously, the FSO connector includes a system for aligning the optic port.

Accordingly, a method is provided for aligning the optic port of a device having a Free Space Optics connector. In a link device with an FSO connector, a controller determines that an optic port alignment procedure is required. A lens is set to an initial wide beam dispersion mode, and a mirror is set to an initial position angle. Note: the lens and mirror may be in the FSO connector receive path or transmit path. An optical signal is communicated at a first low baud rate, and the first baud rate communications are optimized by iteratively adjusting the mirror and narrowing the lens focus. Then, an optical signal is communicated at a second baud rate, faster than the first baud rate, and the second baud rate communications are optimized by iteratively adjusting the mirror and narrowing the lens focus.

The first and second baud rate communications are optimized by communicating a sequence of optical alignment signals while adjusting the mirror through a sequence of angles, and determining a subsequence of mirror angles associated with successful communications. Then, the lens focus is narrowed. The above-described steps can be reiterated any number of times by adjusting the mirror angles through a subsequence and then narrowing the focus.

Additional details of the above-described method, and an FSO connector alignment system are provided below.

DETAILED DESCRIPTION

Figure 1:
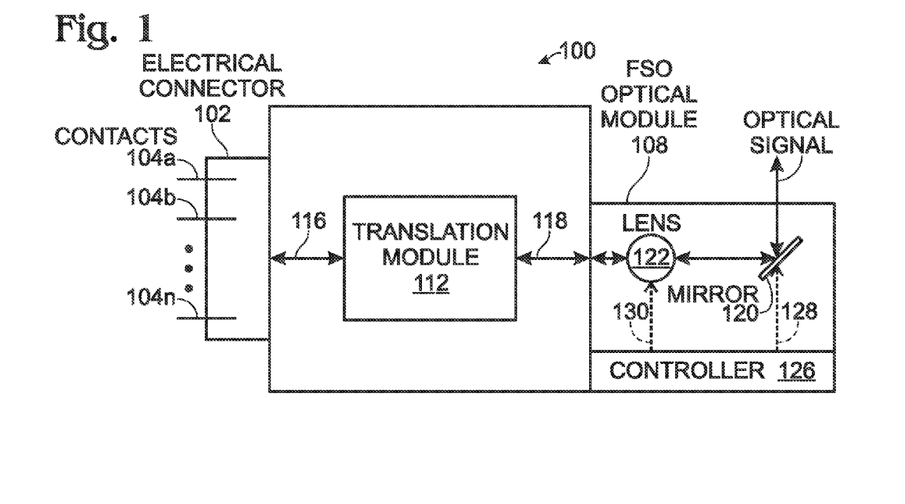
FIG. 1 is a schematic block diagram of a Free Space Optical (FSO) connector with an optical alignment system.

FIG. 1 is a schematic block diagram of a Free Space Optical (FSO) connector having an optical alignment system. The FSO connector 100 comprises an electrical connector 102 having a plurality of contacts 104 for engaging an electronics circuit card connector 106. Shown are contacts 104a through 104n, where n is a variable not limited to any particular value. A Small Form-Factor Pluggable (SFP) connector is one example of an electrical connector. However, there are hundreds of other connector types that could likewise enable the device. An FSO optical module 108 has at least one optic port 110 for transceiving optical signals 124 via free space. As used herein, "transceiving" means to only transmit, only receive, or both transmit and receive signals.

A translation module 112 has a connector interface connected to the electrical connector on line 116 and an optical interface connected to FSO module 108 on line 118. The translation module 112 converts electrical signals received via the electrical connector 102 and transferred as optical signals via the optical interface 118. The translation module 112 converts optical signals received via the optical interface 118 and transferred as electrical signals via the electrical connector 102. Alternately, element 100 may be referred to as an FSO adaptor.

The FSO optical module 108 has an adjustable mirror 120 for reflecting optical signals, and an adjustable lens 122 for focusing optical signals 124. The mirror is adjustable in the sense that the angle formed by the mirror surface and a fixed reference plane can be modified. A controller 126 adjusts the mirror 120 and lens 122 using signals on lines 128 and 130, respectively, in response to receiving optical alignment acknowledgment signals from a communicating device via the optic port. Alternately, the acknowledgement signals may be electrical signals received via the electrical connector 102.

In one aspect, the FSO optical module 108 optimizes optical signals transmitted via the lens 122 and mirror 120. That is, the lens 122 and mirror 120 are in the transmit path. Alternately, the FSO optical module 108 optimizes optical signals received via the lens 122 and mirror 120. That is, the lens 122 and mirror 120 are in the receive path. In another aspect, the FSO optical module 108 supports duplex communications, so the signals are transmitted and received in the same path using a time multiplexing scheme. In yet another aspect not shown, the FSO optical module 108 supports independent transmit and receive paths, and there are mirrors and lens in each of the paths.

Generally, the controller 126 sets the lens 122 to an initial wide beam dispersion mode, and sets the mirror 120 to an initial position angle. First baud rate optical communications are optimized by iteratively adjusting the mirror and narrowing the lens focus. Then, second baud rate optical communications, which are faster than the first baud rate, are optimized by iteratively adjusting the mirror and narrowing the lens focus.

Figure 2A:
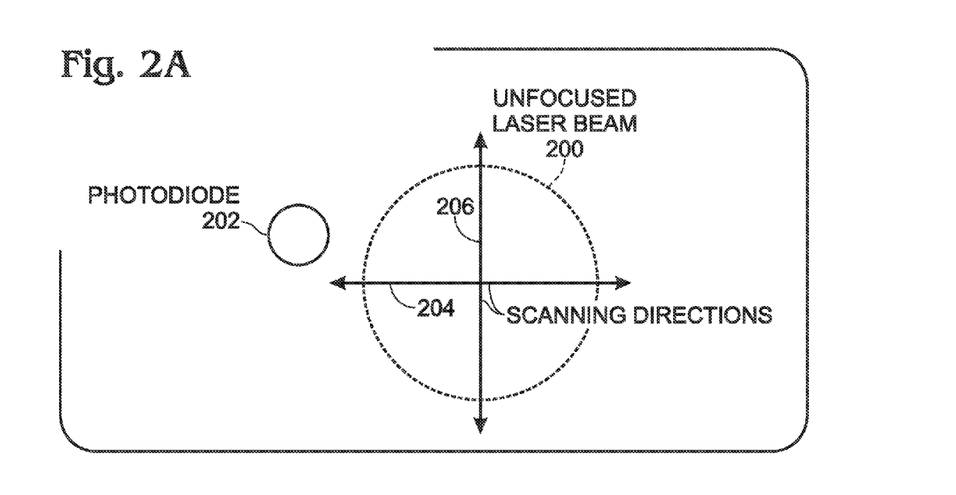
FIGS. 2A through 2C are diagrams depicting an optical signal alignment process.
Figure 2B:
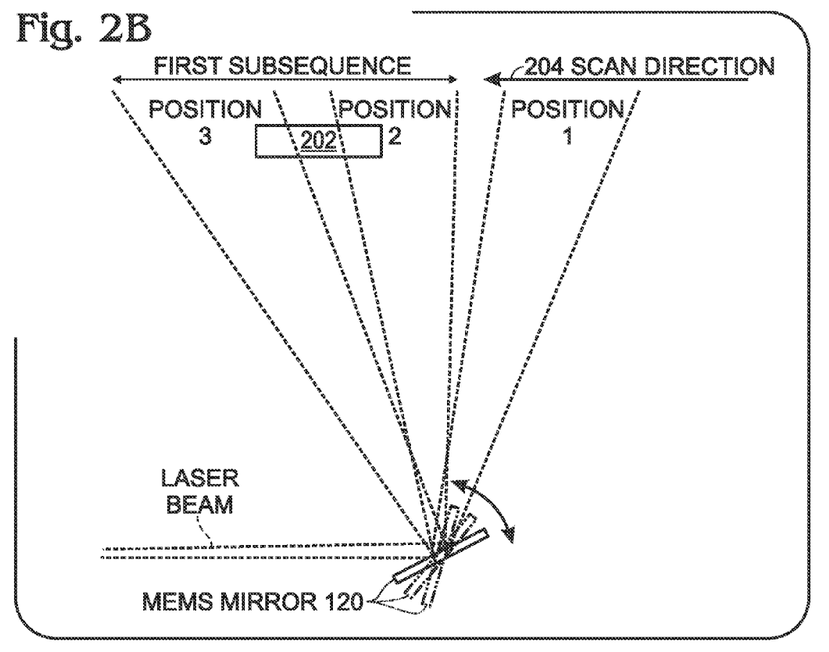
Figure 2C:
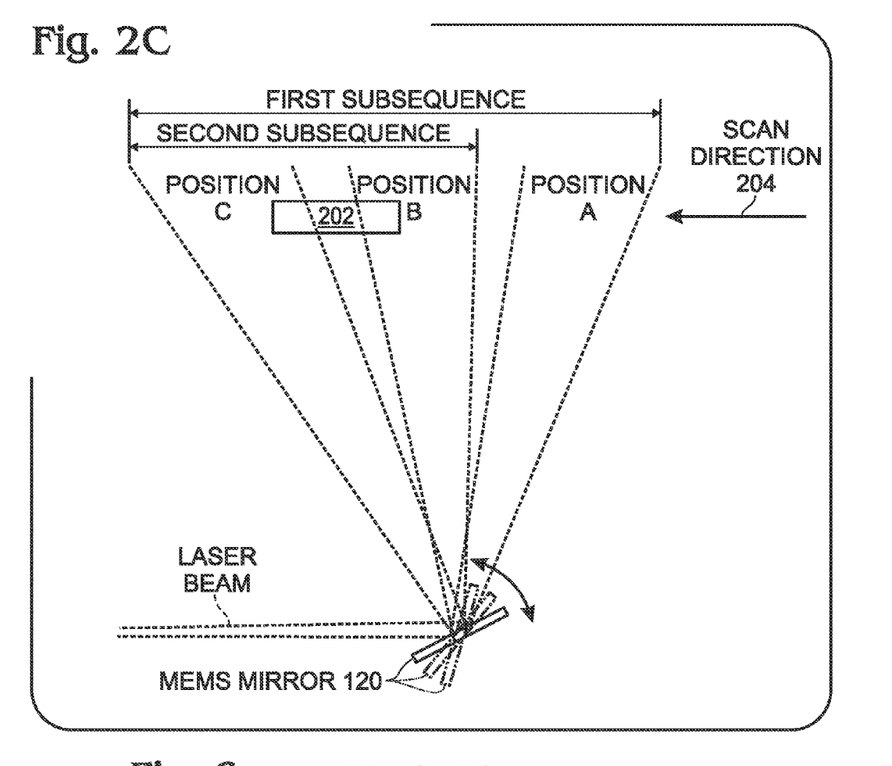

FIGS. 2A through 2C are diagrams depicting an optical signal alignment process. The process depicted in FIGS. 2A-2C is applicable to both first and second baud rate communications, although the range of mirror angles and lens focus need not be the same. The FSO optical module controller optimizes communications by communicating a sequence of optical alignment signals while adjusting the mirror through a sequence of angles.

FIG. 2A represents an unfocused laser beam 200, a photodiode 202 in the receive channel, along with scanning directions 204 and 206. Note: in this example the mirror and lens are in the transmit channel of an FSO connector sending a signal to the photodiode.

After determining a first subsequence of mirror angles associated with successful communications in FIG. 2B, the lens focus is narrowed. In this example, position 2 and position 3 are the first subsequence. Note: the system is not limited to any particular definition of "successful communications". In one aspect, the FSO optical module controller optimizes first baud rate communications by iteratively adjusting the mirror and narrowing the lens focus until a predetermined communications power level is achieved.

In FIG. 2C, the mirror 120 angles are adjusted through the first subsequence, and after determining a second subsequence of mirror angles associated with successful communications, the lens focus can be narrowed again. Typically, the second subsequence is a narrower range of angles within the first subsequence. Further, the definition of "successful" as applied to the second subsequent may be more restrictive than the definition applied to the first subsequence. In this example, positions B and C are associated with the second subsequence. This mirror-adjust/lens focus process may be reiterated any number of times. Ultimately, a median mirror angle is selected from the last subsequence, or last set of subsequences. In one aspect, the FSO optical module controller optimizes second baud rate communications by iteratively adjusting the mirror and narrowing the lens focus until a predetermined information error rate is achieved.

Figure 3:
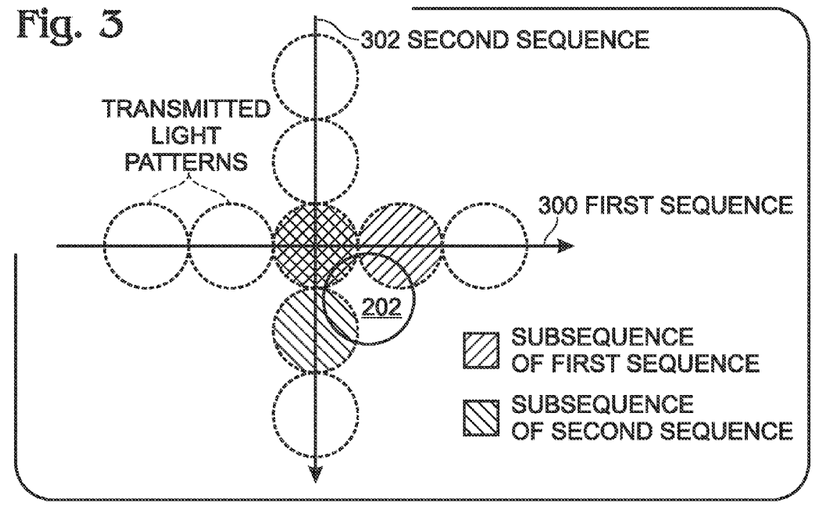
FIG. 3 is a perspective view depicting a variation of mirror adjustment procedure of FIG. 2A or 2B.
Figure 4:
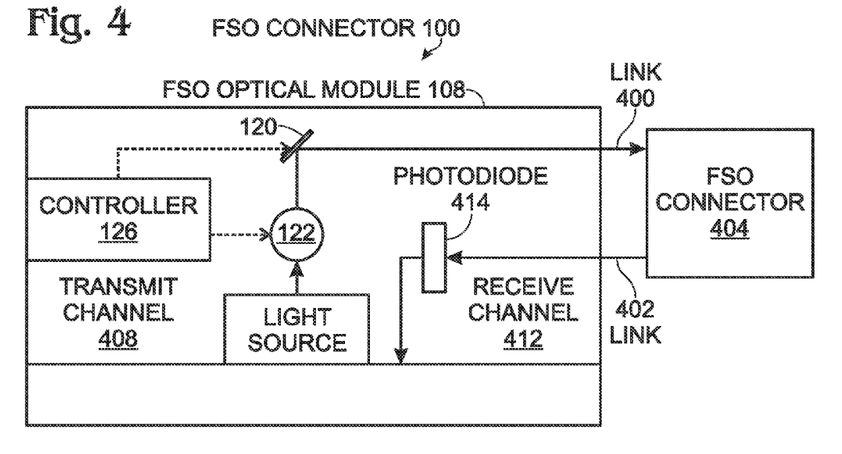
FIG. 4 is a schematic block diagram depicting a network of devices equipped with FSO connectors.

FIG. 3 is a perspective view depicting a variation of mirror adjustment procedure of FIG. 2A or 2B. In one aspect, the FSO optical module controller adjusts the mirror through the sequence of angles by adjusting the mirror through a first sequence of angles associated with a first scan direction 300, and subsequent to determining a subsequence of the first sequence, adjusts the mirror through a second sequence of angles associated with a second scan direction 302. The "angles" are represented on the receive side by transmitted light patterns. After finding a subset of mirror angles in two dimensions, associated with successful communications, the lens focus can be narrowed. Note: although only two, orthogonal scan directions are depicted, the system may be enabled using three, or more scan directions FIG. 4 is a schematic block diagram depicting a network of devices equipped with FSO connectors. When realignment is necessary, it is typically necessary for both ends of the link to perform optical adjustments. However, realignment is aided if first one, and then the other end of the link is aligned. Thus, the FSO optical module controller 126 associated with FSO connector 100 chooses a link for alignment based upon a predetermined priority scheme. For example, the priority scheme may be that the device with the lower serial number aligns first. To continue the example, the priority may determine that FSO connector 100 is aligned first. If the adjustable mirrors and lens of FSO connector 100 are associated with link 400, then link 400 is the first to be aligned. As noted above, the link to be aligned may be either a receiver channel or transmitter channel, as seen from the perspective of FSO connector 100. Here, link 400 is a transmit channel from the perspective of FSO connector 100. Transmit channel 408 includes a light source 410 and receive channel 412 includes a photodiode 414. Note: FSO connector 404 must either make the same priority determinations as FSO connector 100 in order for the priority scheme to work, or the FSO connectors must operate in a master/slave relationship.

Subsequent to optimizing the second baud rate communications for the selected link, the unselected link 402 is aligned. Alternately, subsequent to optimizing the first baud rate communications for the selected link 400, first baud rate communications are optimized for the unselected link 402. Subsequent to optimizing the second baud rate communications for the selected link 400, then second baud rate communications for the unselected link are optimized.

Figure 5:
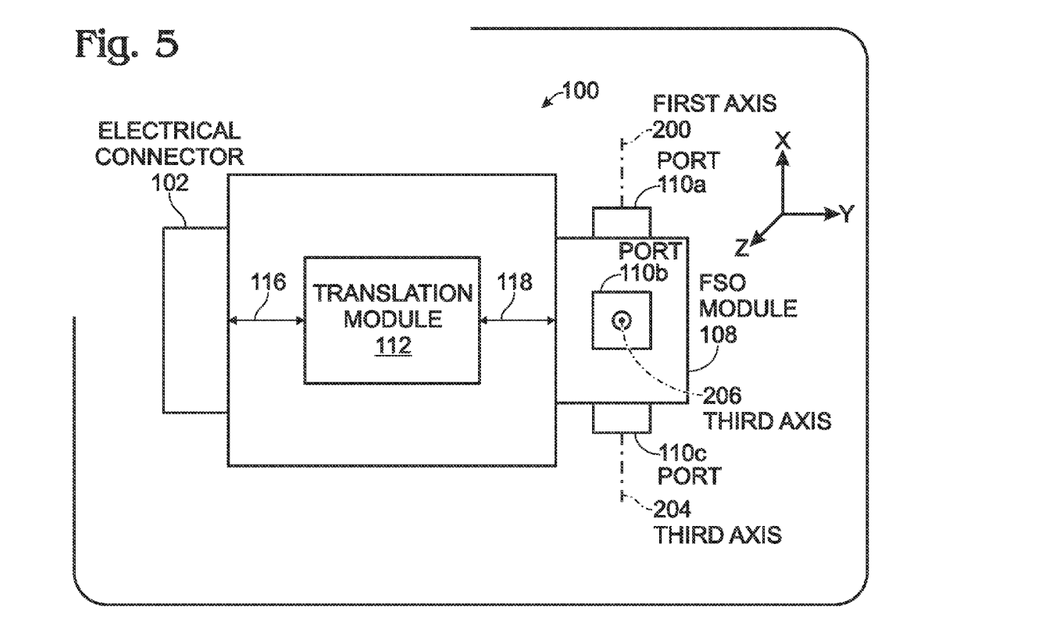
FIG. 5 is a schematic block diagram of a first variation of the FSO connector of FIG. 1.

FIG. 5 is a schematic block diagram of a first variation of the FSO connector of FIG. 1. In one aspect, the FSO optical module 108 includes a plurality of optic ports 110 for transceiving optical signals in a corresponding plurality of directions in free space. Shown are optical ports 110a through 110p, where p is a variable not limited to any particular value. For example, the FSO optical module 108 may transmit and/or receive optical signals along a first axis 200 in free space via port 110a, and transmit/or and receive optical signals along a second axis 202 in free space via port 110b. The second axis is defined with respect the first axis 200. Note: the second axis is coming out of the page (along the z axis) towards the reader. For example, the second axis may be fixed and orthogonal to the first axis. Alternately, the orientation of the first and second axes may be adjustable. As explicitly shown, the FSO optical module 108 may also transmit and receive optical signals along a third axis 204 via free space using port 110c, and transmit and receive optical signals along a fourth axis via free space using port (110n). Note, the fourth axis and port (110n) cannot be seen in this view, as they are on the opposite side of the FSO optical module from port 110b. If the axes are all orthogonal, the first and third axes may be the same, and the second and fourth axes may be the same. Alternately, the first and third axis may be in the same (x) vertical axis, but offset in the (y) horizontal or z axis. Likewise, the second and fourth axes may be in the same z axis, but offset in the x or y axis. Each of the above-mentioned optic ports 110 ay be associated with an adjustable lens and mirror.

Figure 6:
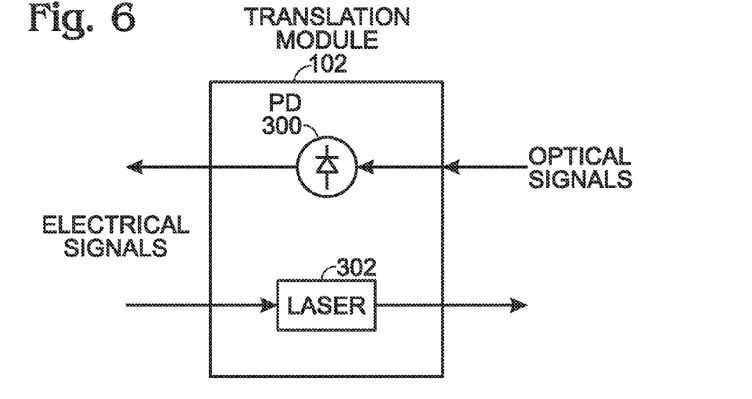
FIG. 6 is a schematic block diagram depicting the translation module of FIG. 1 in greater detail.

FIG. 6 is a schematic block diagram depicting the translation module of FIG. 1 in greater detail. In one aspect, the translation module 112 converts between electrical signals in a first signal format and optical signals in a second signal format. Alternately, the translation module simply reproduces the pulse frequencies, spacings, durations, or intensities of electrical signals into the equivalent optical signal pulse frequencies, spacings, durations, or intensities. In one aspect, the translation module may condition and filter signals without changing the format.

The translation module may be used to pre-condition the electrical signals driving the laser, and process the electrical signals recovered by the PD. For example, the electrical signals may be filtered or (re)aligned with a clock. In one aspect, a clock is generated from the received electrical signal, which is output to the line card via the electrical connector 102. Generally, a received signal requires more processing than a transmitted signal.

In another aspect, the translation module 112 includes a photodiode (PD) 300 to accept optical signals received by the FSO optical module. The PD 300 converts the optical signal to an electrical signal supplied to the electrical connector. The translation module 112 may also include a laser 302 to accept electrical signals received via the electrical connector. The laser 302 converts the electrical signal to an optical signal supplied to the FSO optical module. For example, the laser 302 can be a laser diode.

Figure 7:
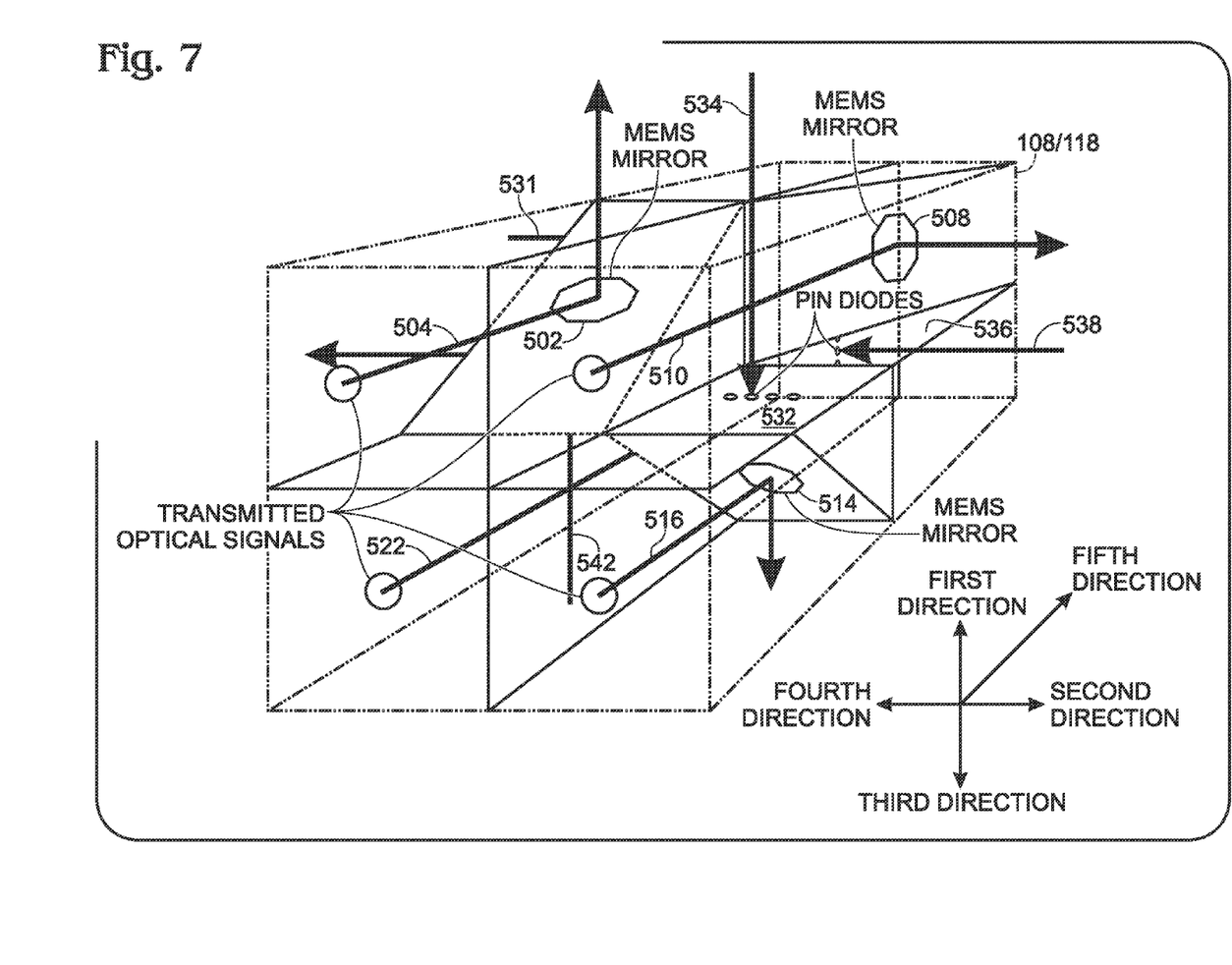
FIG. 7 is a perspective drawing of an FSO optical module transceiving in a plurality of directions through the use of adjustable mirrors.

FIG. 7 is a perspective drawing of an FSO optical module transceiving in a plurality of directions through the use of adjustable mirrors. As shown, the translation module supplies four optical signals in a fifth direction 500. The FSO optical module 108 includes a first mirror 502 to accept a first optical signal 504, and reflect the first optical signal for transmission via free space in the first direction. A second mirror 508 accepts a second optical signal 510 and reflects the second optical signal for transmission via free space in the second direction, orthogonal to the first direction 506. A third mirror 514 accepts a third optical signal 516 and reflects the third optical signal for transmission via free space in the third direction, 180 degrees from the first direction 506 (and orthogonal to second direction). A fourth mirror (520, not shown) accepts a fourth optical signal 522 and reflects the fourth optical signal for transmission via free space in the fourth direction, 180 degrees from the second direction (and orthogonal to the first and third directions).

In this aspect, the translation module 112 includes a multifaceted FSO optical interface 118 including a first surface (530, not shown) orthogonal to the first direction to receive a fifth optical signal 531 via free space from the first direction. A second surface 532 is orthogonal to the second direction to receive a sixth optical signal 534 via free space from the second direction. A third surface 536 is orthogonal to the third direction 518 to receive a seventh optical signal 538 via free space from the third direction. A fourth surface (540, not shown) is orthogonal to the fourth direction to receive an eighth optical signal 542 via free space from the fourth direction.

Figure 8:
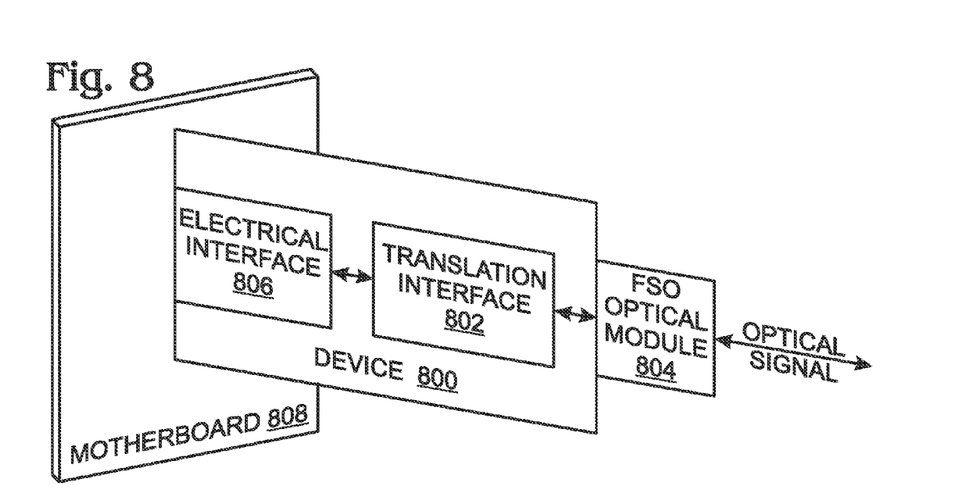
FIG. 8 is a schematic block diagram of a device with a FSO interface.

FIG. 8 is a schematic block diagram of a device with a FSO interface. As shown, the device 800 may be a circuit card or line card with a ("built-in") FSO interface 804 and electrical interface 806 connected to a motherboard 808. The built-in FSO interface shares many of the characteristics of the FSO connector shown in FIGS. 1 through 4, so some explicitly details are skipped in the interest of brevity.

Optionally as shown, the device may include a translation interface 802 to convert between electrical signals in the device and optical signals transceived via the FSO optical module 804. The translation interface 802 performs many of the same functions performed by the translation module of FIG. 1. Alternately, it is possible for the device to process optical signals, in which case a translation module is not necessary.

As with the FSO connector of FIG. 1, the FSO optical module includes an adjustable mirror for reflecting optical signals, an adjustable lens for focusing optical signals, and a controller for sending adjustment signals to the mirror and lens. The mirror, lens, and controller are shown in FIG. 1. The controller sets the lens to an initial wide beam dispersion mode, sets the mirror to an initial position angle, optimizes first baud rate optical communications by iteratively adjusting the mirror and narrowing the lens focus. Then, the controller optimizes second baud rate optical communicates, faster than the first baud rate, by iteratively adjusting the mirror and narrowing the lens focus.

Functional Description

Figure 9:
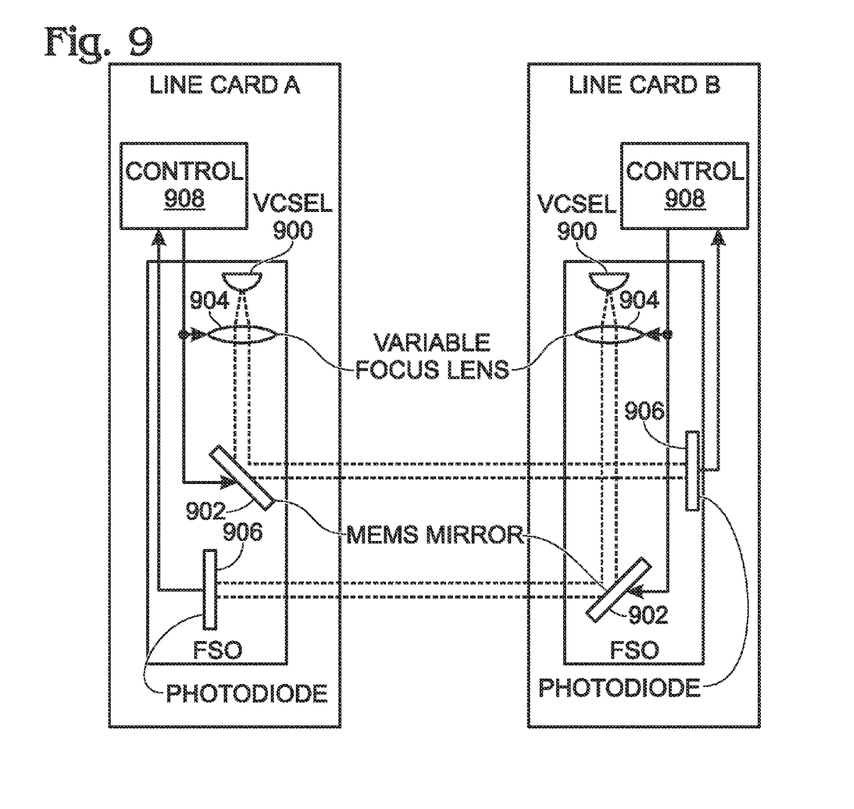
FIG. 9 is a schematic block diagram depicting two line cards, A and B, with established bidirectional FSO communication.

FIG. 9 is a schematic block diagram depicting two line cards, A and B, with established bidirectional FSO communication. Each line card deploys laser source 900, microelectromechanical system (MEMS) mirror 902, variable focus lens 904, photodiode 906, and control logic 908 necessary to maintain and restore the LOS channel.

Figure 10:
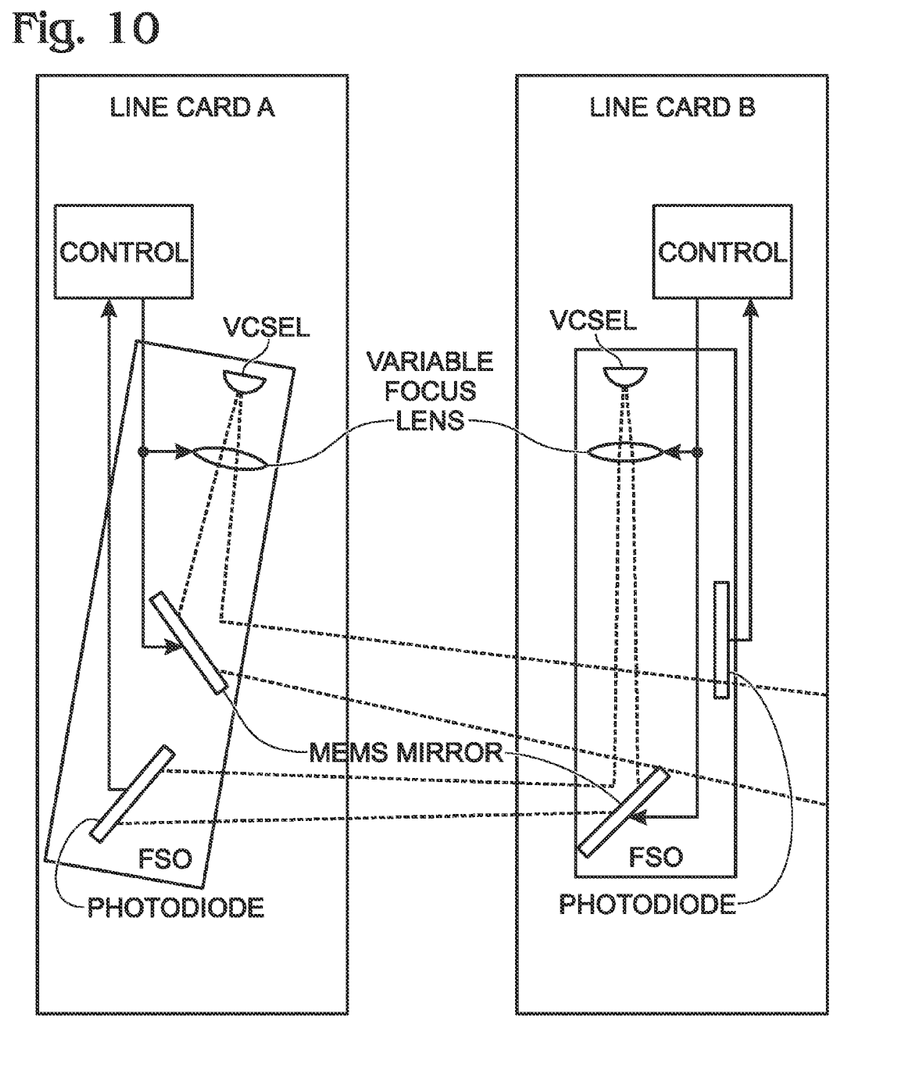
FIG. 10 illustrates the result of the event that has caused the alignment of the FSO on a line card A to be lost.

FIG. 10 illustrates the result of the event that has caused the alignment of the FSO on a line card A to be lost.

The loss of the signal by Line Card B triggers the invocation of the realignment procedure. The following procedure is a variation of the procedure presented above in the description of FIGS. 2A, 2B, and 3. The instant procedure consists of 2 major phases:
1. Discovery of the new correct mirror deflection angles; and,
2. Refocusing the laser beam in order to return to the high speed communication.

Phase I—Discovery of the New Correct Mirror Deflection Angles
a) Both cards unfocus laser beams and revert to very low baud rate signaling.
b) Both cards transmit IDs.
c) Each card compares its own ID to the received ID, and the lower priority card transmits a "defer" signal.
d) The lower priority card sending the "defer" signal starts the discovery phase.
  1. The lower priority card scan space horizontally with the mirror, waiting for a "light" signal indicating that the photodiode of the higher priority card is illuminated. Note: in this aspect, the mirror and lens are in the transmit path.
  2. Once the "light" signal is received, the lower priority card records the angle at which the light is initially detected, and continues scanning into the same direction.
  3. While continuing the scan, the lower priority card records when the "light" signal is removed, indicating the angle where light is no longer detected.
  4. The median horizontal angle between the two recorded angles is determined.
  5. The same procedure is repeated in the vertical direction resulting in discovery of the median vertical angle.
  6. After discovering the horizontal and vertical medians, the lower priority card signals the higher priority card using the low baud rate, signaling that it has finished the discovery phase and that the higher priority card may start its discovery phase.
  7. The higher priority card repeats steps 1 through 5 guided by the feedback from the lower priority card.
  8. When the higher priority card signals the end of its Discovery phase, the Refocusing phase can begin Phase II—Refocusing
a) The lower priority card successively narrows the focus of the laser beam while monitoring a "slow" signal from the higher priority card, indicating whether the photodiode is lit.
b) If by the end of the re-focusing step, the higher priority card indicates that the photodiode is still lit, the lower priority card has completed the refocusing phase.
c) If at some point the higher priority card indicates that the photodiode is dark, the lower priority card diffuses the focus of its beam to the point where the photodiode of the higher priority device is lit again, and the angle discovery procedure is repeated to improve the precision of the angular adjustment.
d) When the lower priority card completes refocusing, then the higher priority card can start its Refocusing phase, repeating steps (a) through (c).

Figure 11:
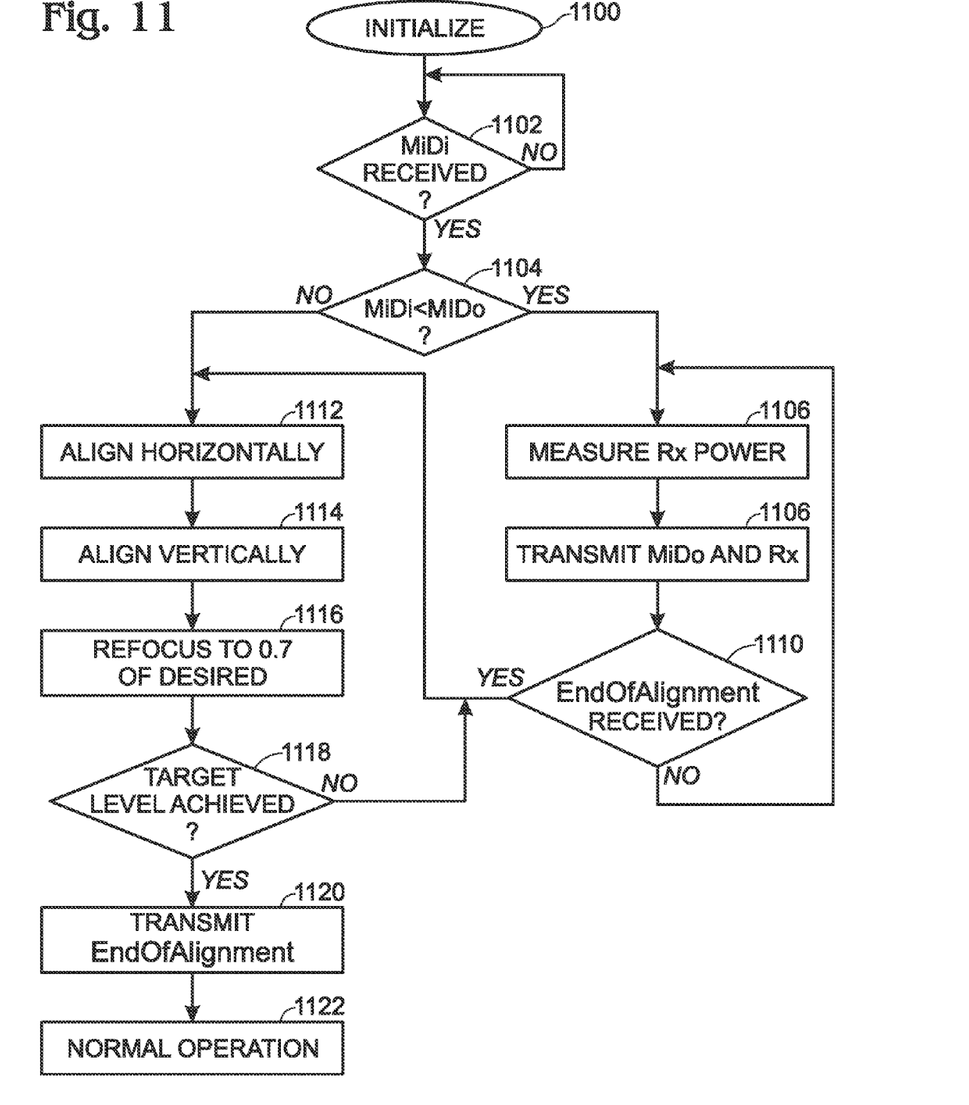
FIG. 11 is a flowchart illustrating an exemplary alignment process.

FIG. 11 is a flowchart illustrating an exemplary alignment process. The process starts with an initialization in Step 1100. A low baud rate (9600 bits per second) is selected, the lens is defocused and the mirror is set to an initial start position (left/down). The unit also transmits its identity (MIDo). If the identity of a communicating unit (MIDi) is received in Step 1102, the process continues to Step 1104. In Step 1104 priority is determined by comparing the unit's identity with the received identity. If the unit has higher priority, the process continues to Step 1106 and 1108, where the unit measures Rx power and returns acknowledgements so that the lower priority can adjust its mirror and lens. Again, it is assumed that the adjustable mirror and lens are located in the transmit channel. If Step 1110 determines that the lower priority has finished its alignment, the process goes to Step 1112. A horizontal mirror alignment is preformed in Step 1112 and a vertical alignment is performed Step 1114. In Step 1116 the focus of the lens is narrowed. If the target power level or target error rate is achieved in Step 1118, the alignment process is complete (Step 1120) and the unit begins normal operation in Step 1122.

Figure 12A:
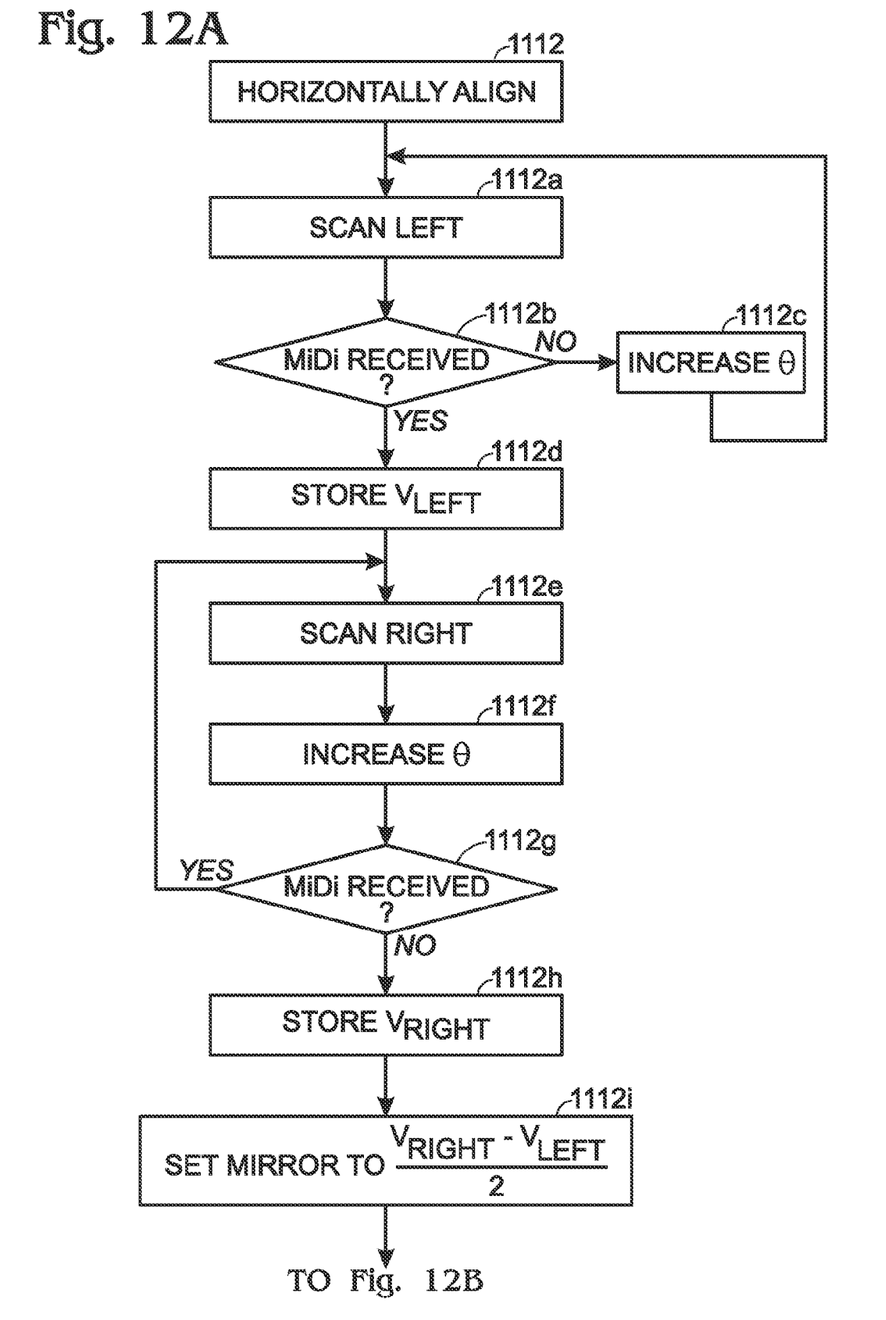
FIG. 12A illustrates details of the vertical alignment step, Step 1112 of FIG. 11.

FIG. 12A illustrates details of the horizontal alignment step, Step 1112 of FIG. 11. In Step 1112*a* the unit aligning its mirror and lens begins moving (scanning) the mirror towards the "left". If feedback is received from the communicating unit (Step 1112*b*) that the optical signal is not being received, then the angle is increased (the scan continues left) in Step 1112*c*. Once the feedback indicates the reception of an optical signal, the associated mirror position is stored in Step 1112*d*. In Steps 1112*e* through 1112*h*, the procedure is repeated to the "right". The average of the right and left mirror positions is determined in Step 1112*i*

Figure 12B:
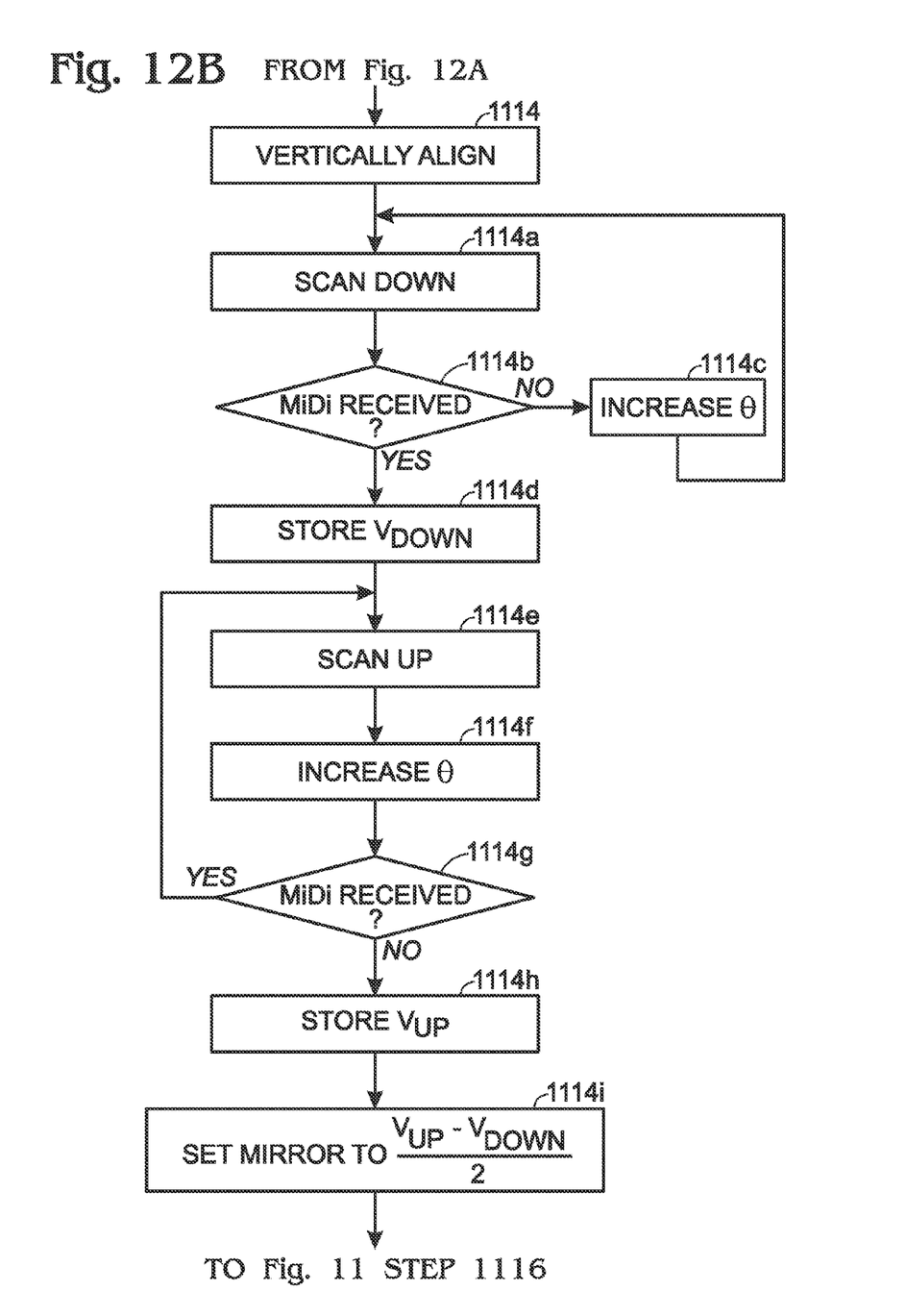
FIG. 12B illustrates details of the vertical alignment step, Step 1114 of FIG. 11.

FIG. 12B illustrates details of the vertical alignment step, Step 1114 of FIG. 11. In Step 1114*a* the unit aligning its mirror and lens begins moving (scanning) the mirror "down". If feedback is received from the communicating unit (Step 1114*b*) that the optical signal is not being received, then the angle is increased (the scan continues down) in Step 1114*c*. Once the feedback indicates the reception of a signal, the associated mirror position is stored in Step 1114*d*. In Steps 1114*e* through 1114*h*, the procedure is repeated scanning "up". The average of the down and up mirror positions is determined in Step 1114*i*

Figure 13:
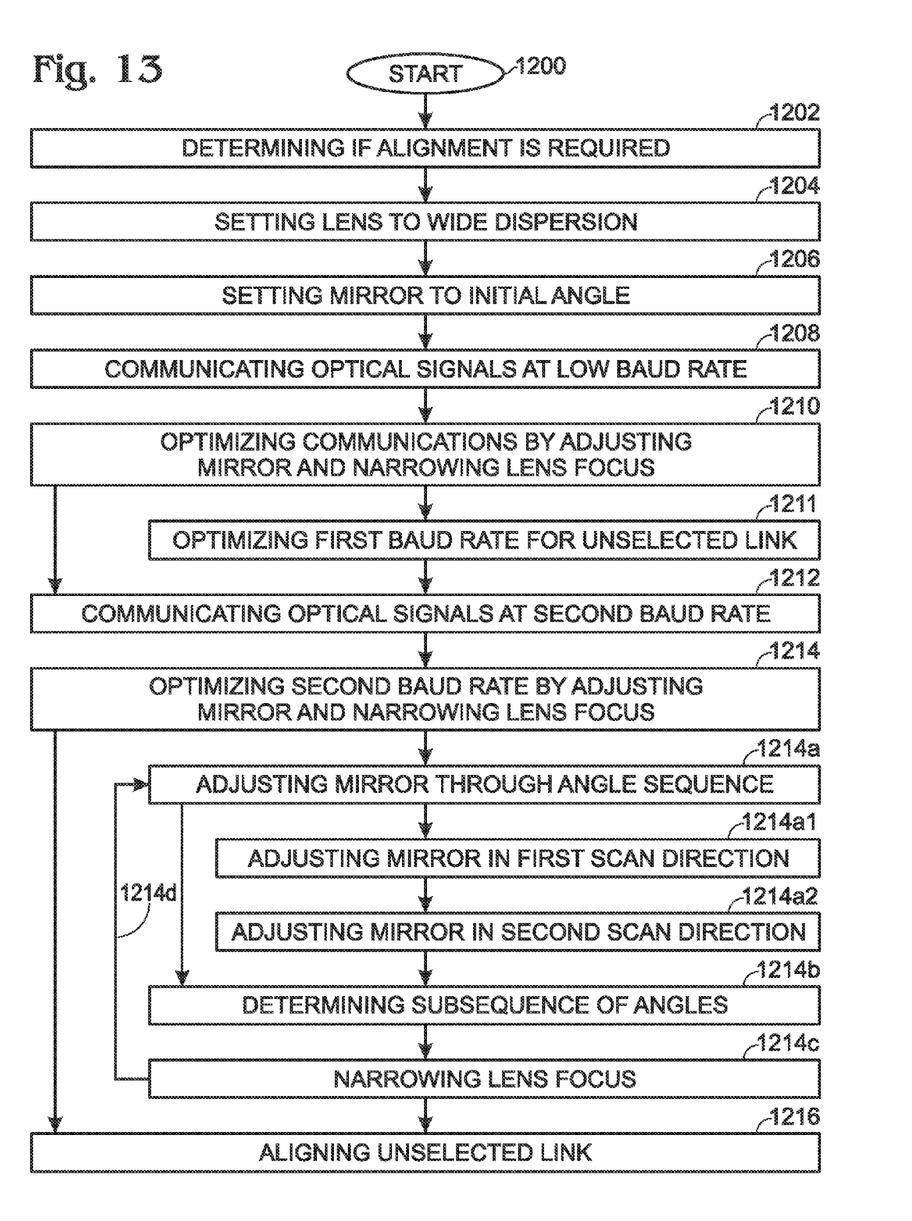
FIG. 13 is a flowchart illustrating a method for aligning the optic port of a device having an FSO connector.

FIG. 13 is a flowchart illustrating a method for aligning the optic port of a device having an FSO connector. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1200.

In a link device with an FSO connector, a controller determines in Step 1202 that an optic port alignment procedure is required. Step 1204 sets a lens to an initial wide beam dispersion mode. Step 1206 sets a mirror to an initial position angle. Step 1208 communicates an optical signal at a first low baud rate. Step 1210 optimizes first baud rate communications by iteratively adjusting the mirror and narrowing the lens focus. In one aspect, Step 1210 iteratively adjusts the mirror and narrows the lens focus until a predetermined communications power level is achieved. Step 1212 communicates an optical signal at a second baud rate, faster than the first baud rate. Step 1214 optimizes second baud rate communications by iteratively adjusting the mirror and narrowing the lens focus. In one aspect, Step 1214 iteratively adjusts the mirror and narrows the lens focus until a predetermined information error rate is achieved.

Optimizing the first baud rate signals in Step 1210 or optimizing the second baud rate optical signals in Step 1214 means that the optical signals being transmitted to a link partner are optimized, and that optical signal acknowledgements to the transmissions are received from the link partner. That is, the mirror and lens are in the transmit channel. Alternately, the mirror and lens are in the receive channel, and the optical signals received from a link partner are optimized while optical signal acknowledgements are transmitted to the link partner.

In one aspect, optimizing first and second baud rate communications includes substeps. The substeps are shown associated with Step 1214. These same substeps could be shown associated with Step 1210, but have been omitted in the interest of brevity. Step 1214*a* communicates a sequence of optical alignment signals while adjusting the mirror through a sequence of angles. Step 1214*b* determines a subsequence of mirror angles associated with successful communications. Step 1214*c* narrows the lens focus, and the arrow labeled with reference designator 1214*d* indicates that the above-described steps (Steps 1214*a*-1214*c*) of adjusting the mirror angles, determining mirror angles associated with successful communications, and narrowing the focus can be reiterated.

In another aspect, adjusting the mirror through the sequence of angles in Step 1214*a* includes additional substeps. Step 1214*a*1 adjusts the mirror through a first sequence of angles associated with a first scan direction. Subsequent to determining a subsequence of the first sequence associated with successful communications, Step 1214*a*2 adjusts the mirror through a second sequence of angles associated with a second scan direction.

In one aspect, determining that the optic port alignment procedure is required in Step 1202 means that the step is initiated in response to failing to successfully receive communications from a link partner, or receiving messages indicating that the link partner is failing to successfully receive messages.

In another aspect, determining that the optic port alignment procedure is required in Step 1202 includes choosing a link for alignment based upon a predetermined priority scheme, where the link is either a receiver channel or a transmitter channel. Then, subsequent to optimizing the second baud rate communications for the selected link in Step 1214, Step 1216 aligns the unselected link. As an alternative, Step 1211 optimizes first baud rate communications for the unselected link subsequent to optimizing the first baud rate communications for the selected link in Step 1210. Then, optimizing the second baud rate communications in Step 1214 includes optimizing second baud rate communications for the selected link, subsequent to optimizing the first baud rate communications for the unselected link (Step 1211). Subsequent to optimizing the second baud Tate communications for the selected link in Step 1214, Step 1216 optimizes second baud rate communications for the unselected link.

An FSO connector alignment system and methodology have been provided. A SFP line card has been used to illustrate the invention. However, the invention is not limited to any particular type of circuitry of signal format. Other variations and embodiments of the invention will occur to those skilled in the art.

We claim:

1. A Free Space Optical (FSO) connector having an optical alignment system, the connector comprising:
    an electrical connector having a plurality of contacts for engaging an electronics circuit card connector;
    an FSO optical module having an adjustable mirror and an adjustable lens for focusing optical signals associated with a first link, and at least two optic ports for transceiving optical signals via free space;
    a translation module having a connector interface connected to the electrical connector and an optical interface connected to FSO module, the translation module converting electrical signals received via the electrical connector and transferred as optical signals via the optical interface, and converting optical signals received via the optical interface and transferred as electrical signals via the electrical connector;
    a controller aligning the first link at a first baud rate and a second baud rate, faster than the first baud rate, by setting the lens to an initial wide beam dispersion mode, setting the mirror to an initial position angle, optimizing first baud rate optical communications by iteratively adjusting the mirror and narrowing the lens focus, and optimizing second baud rate optical communications by iteratively adjusting the mirror and narrowing the lens focus; and,
    wherein the controller chooses a link for alignment based upon a predetermined priority scheme, where the link is selected from a group consisting of a receiver channel and a transmitter channel, and subsequent to optimizing optical communications for the selected link, aligns the unselected link.

2. The system of claim 1 wherein the FSO optical module includes a controller, the controller adjusting the mirror and lens in response to receiving optical alignment acknowledgment signals from a communicating device via the optic port.

3. The system of claim 1 wherein the FSO optical module optimizes optical signals transmitted via the lens and mirror.

4. The system of claim 1 wherein the FSO optical module optimizes optical signals received via the lens and mirror.

5. The system of claim 1 wherein the FSO optical module controller optimizes first and second baud rate communications by communicating a sequence of optical alignment signals while adjusting the mirror through a sequence of angles, determines a first subsequence of mirror angles associated with successful communications, narrows the lens focus, adjusts the mirror angles through the subsequence, determines a second subsequence of mirror angles associated with successful communications, and narrows the focus.

6. The system of claim 5 wherein the FSO optical module controller adjusts the mirror through the sequence of angles by adjusting the mirror through a first sequence of angles associated with a first scan direction, and subsequent to determining a subsequence of the first sequence associated with successful communications, adjusts the mirror through a second sequence of angles associated with a second scan direction, and determines a subsequence of the second sequence associated with successful communications.

7. The system of claim 1 wherein the FSO optical module controller, subsequent to optimizing the first baud rate communications for the selected link, optimizes first baud rate communications for the unselected link, and subsequent to optimizing the second baud rate communications for the selected link, optimizes second baud rate communications for the unselected link.

8. The system of claim 1 wherein the FSO optical module controller optimizes second baud rate communications by iteratively adjusting the mirror and narrowing the lens focus until a predetermined information error rate is achieved.

9. The system of claim 1 wherein the FSO optical module controller optimizes first baud rate communications by iteratively adjusting the mirror and narrowing the lens focus until a predetermined communications power level is achieved.

10. The system of claim 1 wherein the FSO optical module controller, subsequent to optimizing first baud rate communications for the selected link, optimizes second baud rate communications for the selected link, and subsequent to optimizing second baud rate communications for the selected link, optimizes the first baud rate communications for the unselected link, and subsequent to optimizing first baud rate communications for the unselected link optimizes the second baud rate communications for the unselected link.

11. A method for aligning the optic port of a device having a Free Space Optics (FSO) connector, the method comprising:
- in a link device with an FSO connector, a controller determining that an optic port alignment procedure is required, and choosing a link for alignment based upon a predetermined priority scheme, where the link is selected from a group consisting of a receiver channel and a transmitter channel;
- setting a lens to an initial wide beam dispersion mode;
- setting a mirror to an initial position angle;
- communicating an optical signal at a first low baud rate;
- optimizing first baud rate communications by iteratively adjusting the mirror and narrowing the lens focus;
- communicating an optical signal at a second baud rate, faster than the first baud rate;
- optimizing second baud rate communications by iteratively adjusting the mirror and narrowing the lens focus; and,
- subsequent to optimizing the second baud rate communications for the selected link, aligning the unselected link.

12. The method of claim 11 wherein optimizing the first and second baud rate optical signals includes:
- optimizing optical signals transmitted to a link partner; and,
- receiving optical signal acknowledgements to the transmissions from the link partner.

13. The method of claim 11 wherein optimizing the first and second baud rate optical signal includes:
- optimizing optical signals received from a link partner; and,
- transmitting optical signal acknowledgements to the link partner.

14. The method of claim 11 wherein optimizing first and second baud rate communications includes:
- communicating a sequence of optical alignment signals while adjusting the mirror through a sequence of angles;
- determining a subsequence of mirror angles associated with successful communications;
- narrowing the lens focus; and,
- reiterating the above-described steps by adjusting the mirror angles, determining mirror angles associated with successful communications, and narrowing the focus.

15. The method of claim 14 wherein adjusting the mirror through the sequence of angles includes:
- adjusting the mirror through a first sequence of angles associated with a first scan direction; and,
- subsequent to determining a subsequence of the first sequence associated with successful communications, adjusting the mirror through a second sequence of angles associated with a second scan direction.

16. The method of claim 11 wherein determining that the optic port alignment procedure is required includes an operation selected from a group consisting of failing to successfully receive communications from a link partner and receiving messages indicating that the link partner is failing to successfully receive messages.

17. The method of claim 11 wherein optimizing first baud rate communications includes iteratively adjusting the mirror and narrowing the lens focus until a predetermined communications power level is achieved.

18. The method of claim 11 wherein optimizing second baud rate communications includes iteratively adjusting the mirror and narrowing the lens focus until a predetermined information error rate is achieved.

19. A method for aligning the optic port of a device having a Free Space Optics (FSO) connector, the method comprising:
- in a link device with an FSO connector, a controller determining that an optic port alignment procedure is required, and choosing a link for alignment based upon a predetermined priority scheme, where the link is selected from a group consisting of a receiver channel and a transmitter channel;
- for the selected link, setting a lens to an initial wide beam dispersion mode;
- setting a mirror to an initial position angle;
- communicating an optical signal at a first low baud rate;
- optimizing first baud rate communications by iteratively adjusting the mirror and narrowing the lens focus;
- subsequent to optimizing the first baud rate communications for the selected link, optimizing first baud rate communications for the unselected link;
- for the selected link, communicating an optical signal at a second baud rate, faster than the first baud rate;
- optimizing second baud rate communications by iteratively adjusting the mirror and narrowing the lens focus; and,
- subsequent to optimizing the second baud rate communications for the selected link, optimizing second baud rate communications for the unselected link.

* * * * *